Aug. 8, 1950  S. E. HILBLOM  2,518,317
IMPLEMENT ATTACHMENT FRAME, ESPECIALLY FOR MOWERS
Filed Aug. 16, 1947  2 Sheets-Sheet 1

INVENTOR.
Samuel E. Hilblom
BY Paul O. Pippel
Atty.

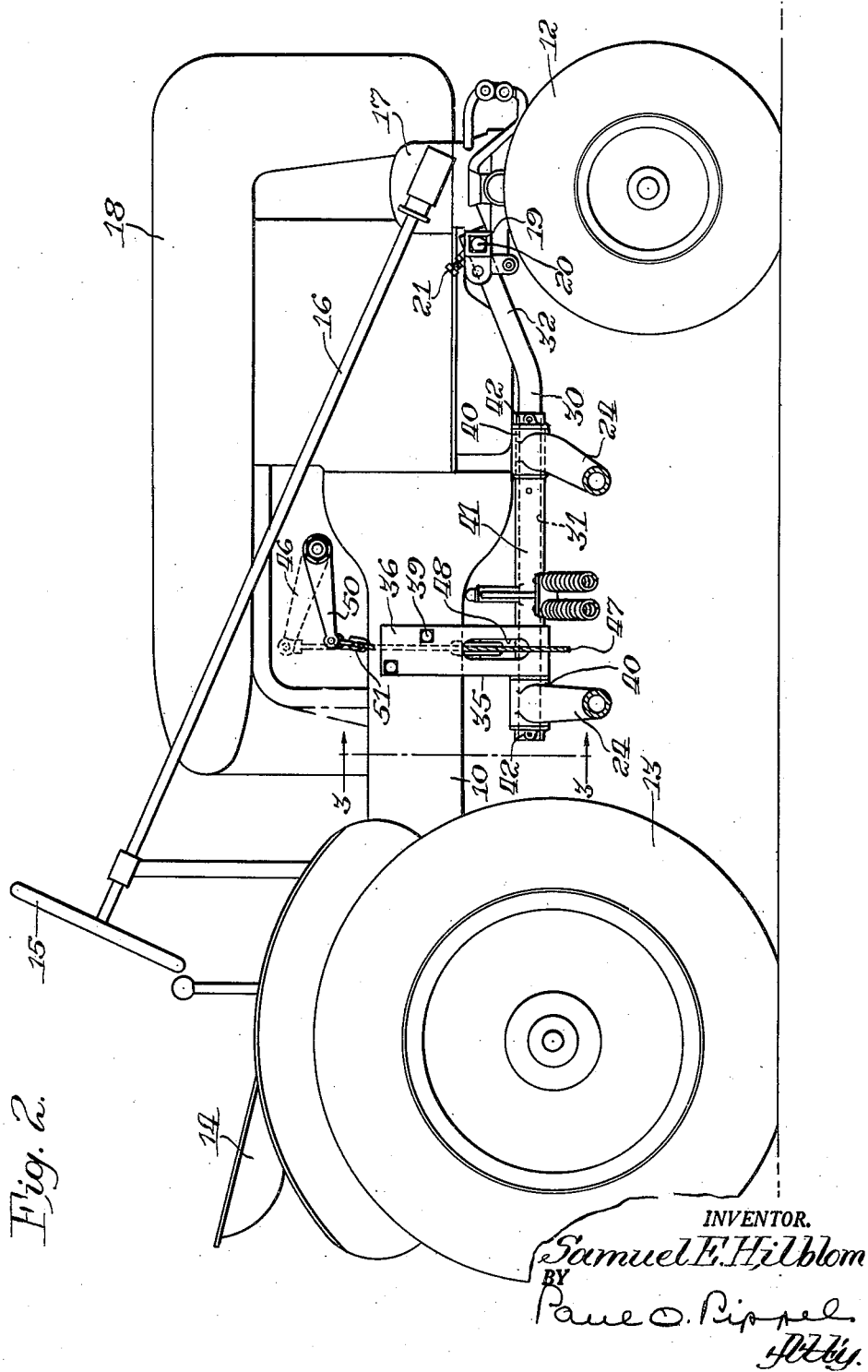

Patented Aug. 8, 1950

2,518,317

UNITED STATES PATENT OFFICE 2,518,317

IMPLEMENT ATTACHMENT FRAME,
ESPECIALLY FOR MOWERS

Samuel E. Hilblom, Chicago, Ill., assignor to International Harvester Company, a corporation of New Jersey Application August 16, 1947, Serial No. 769,039

9 Claims. (Cl. 56—25)

1

*General statement of the invention—
its objects and purposes*

The invention relates to means for associating an agricultural implement with a tractor or like wheeled structure. More particularly the invention relates to an improved tractor mower construction embodying a simplified attaching frame and control means for the mower.

One of the prime requisites of tractor-mounted agricultural implements is that the tractor be adapted to carry at different times a wide variety of implements, for the purpose of enabling the tractor to be used with a relatively large number of implements according to seasonal requirements. For this reason it is not necessary that an individual own as many tractors as he does implements. In many instances, however, the mode of attaching certain implements to the tractor is so complicated as to impose upon the farmer a task requiring a considerable expenditure of time and labor, with the result that a successful program of tractor farming may prove disadvantageous in certain respects.

The present invention contemplates and has for a principal object the provision of an improved implement attaching frame that may be utilized for the purpose of mounting an implement on the tractor so that it may be easily and quickly detached and just as easily and just as quickly reattached.

It is an important object of the invention to adapt such implement attaching frame primarily for use in tractor-mounted mowers, particularly such mowers of the side mounted type in which the mower extends laterally at one side of the tractor between the front and rear wheels of the tractor. It is likewise an object of the invention to provide generally an improved mower structure incorporating the simplified mounting frame in conjunction with means for raising and lowering the mower with respect to the tractor.

Other objects of the invention include: the provision of a frame structure comprising a single frame member provided at opposite ends with means for attachment to the tractor and having intermediate its ends a portion for supporting an implement such as a mower; the provision of an attachment frame that is readily adapted to tractors of existing types; and a frame member that is rigid and inexpensive in construction and that may be easily and quickly attached to and detached from the tractor while remaining connected to the implement.

The foregoing and other important objects and desirable features inherent in and encompassed

2 by the invention, together with many of the purposes and uses thereof, will become readily apparent from a reading of the ensuing description in conjunction with the annexed drawings.

*Description of the drawings*

Figure 2 is a side elevational view of the structure shown in Figure 1, a portion of the mower being removed along the line 2—2 of Figure 1.

*Tractor structure*

Figure 1:
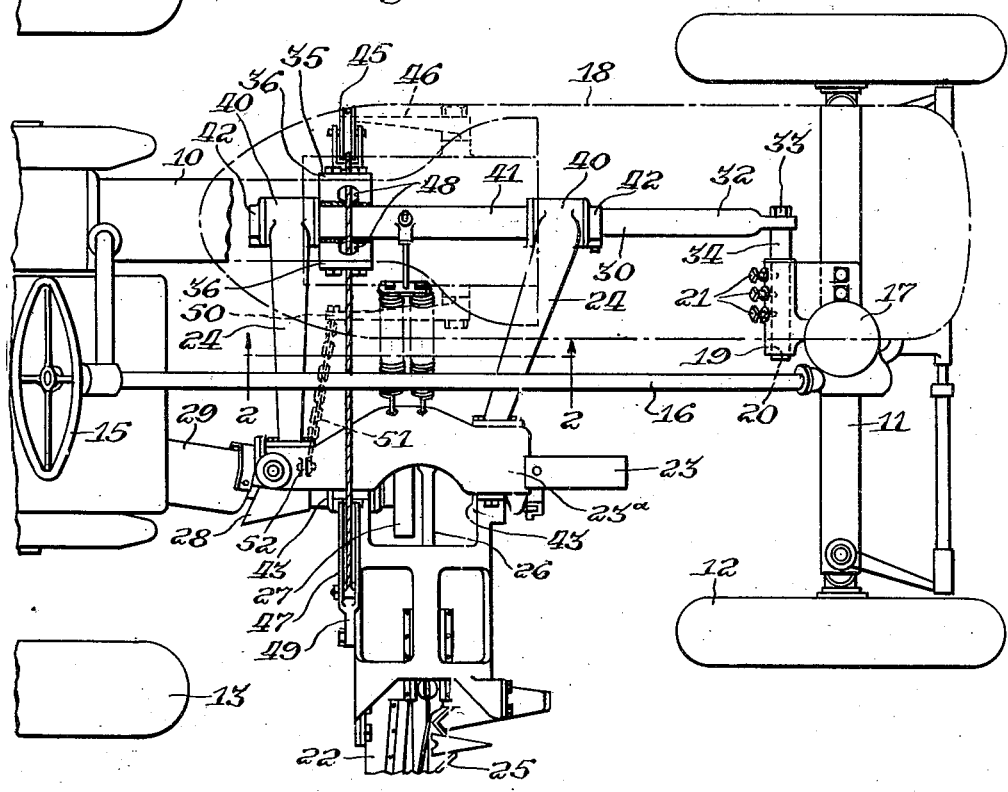
Figure 1 is a general plan view of a tractor-mounted mower, the tractor being representative of a well known type and portions thereof being indicated in broken lines to more clearly illustrate the mower structure below.

The tractor chosen for the purposes of illustration comprises a longitudinal body or frame structure 10 carried at its front end on a transverse front axle structure 11, including front wheels 12, and at its rear end on rear wheels 13. An operator's station 14 is provided at the rear of the tractor adjacent steering mechanism including a steering wheel 15 and a downwardly and forwardly inclined steering rod 16 which is associated in the conventional manner with gearing (not shown) contained in a housing 17 at the front end of the body structure 10. A longitudinal hood and radiator grill structure 18 is carried above the body structure and overlies the tractor power plant.

The front axle structure 11 includes thereon just rearwardly of the steering gear housing 17 an implement attaching bracket 19 provided with a transverse socket or square opening 20. The bracket 19 includes a plurality of capscrews 21 threaded through a wall of the bracket and adapted to engage a member carried by the socket 20.

The structure just described is generally conventional and forms no part of the present invention except insofar as it is associated with the frame structure forming the subject matter of the invention.

*Mower structure*

The mower proper is carried by the body structure 10 of the tractor between the front and rear wheels of the tractor and includes a cutter-bar 22 extending laterally outwardly at the right-hand side of the tractor. The cutter-bar is carried at its inner end on a runner or shoe 23 which preferably includes a casting 23a to the inside portion of which is connected a pair of inwardly extending supports 24.

The cutter-bar 22 includes a sickle 25 which may be driven in the usual manner by a pitman 26 connected to a flywheel 27. The flywheel may be driven by appropriate shafting (not shown) contained within a housing 28 and tubular shield 29.

This mower structure in its particular aspects forms no part of the present invention and has been merely illustrated for the purpose of providing an understanding of the invention.

Attachment frame

Figure 3:
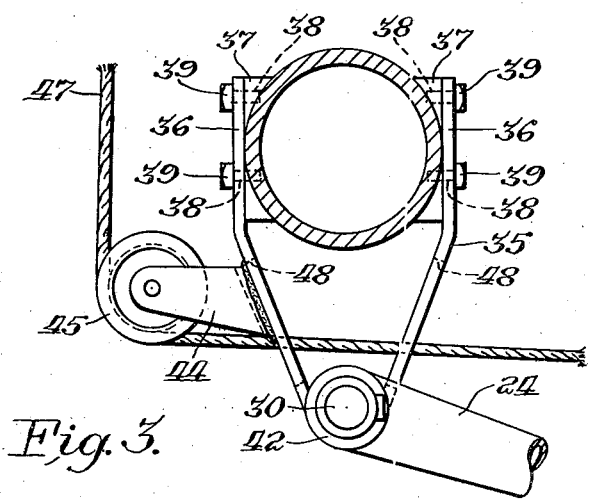
Figure 3 is an enlarged transverse sectional view taken substantially on the line 3—3 of Figure 2.

The attachment frame by which the mower is connected to the body structure comprises essentially an elongated frame member 30 disposed lengthwise beneath the tractor body 10. The frame member 30 is preferably tubular in cross-section to provide for lightweight construction and appropriate rigidity. A substantial portion of the frame member is straight as at 31 and a forward portion 32 thereof is bent or offset at an angle to the straight portion. The extreme forward end of the portion 32 has rigidly secured thereto as by means of a capscrew 33 a transversely extending securing member 34 which is received by the socket 20 and engaged by the capscrews 21 of the mounting bracket 19 at the forward end of the tractor. The rearward portion of the frame member 30 includes means for attaching that portion to the tractor body 10. The bent or displaced portion 32 and transverse securing member 34 provides one attaching element by means of which the frame 30 may be attached to and detached from the tractor. The second attaching element at the rear of the frame 30 comprises a U-shaped support 35 rigidly secured at its bight portion to the frame member 30 and having its legs 36 extending upwardly from or normal to the principal axis of the frame member 30. The upper portions of the legs 36 embrace the intermediate portion of the tractor body 10 (Figure 3). This part of the tractor body is provided with mounting pads 37, each of which includes a plurality of tapped openings 38 for receiving capscrews 39 passed through openings formed in the legs 36. By this means the rear end portion of the frame member 30 may be readily attached to and detached from the tractor body structure.

Lifting and lowering means

The inner ends of the mower-carrying frame members 24 are provided as bearings 40 which are carried on the straight implement carrying portion 31 of the frame member 30. A spacer tube 41 is carried by the frame portion 31 between the bearings 40 and a pair of collars 42 are likewise carried on the frame portion 31 to prevent longitudinal displacement of the frame members 24 although permitting vertical swinging of the frame members about the axis of the member 30.

The casting 23a includes a pair of bearings 43 alined on a longitudinal axis and providing pivot means about which the cutter-bar may be raised and lowered with respect to the tractor. The general arrangement by means of which the cutter-bar is pivoted at its inner shoe is well known.

The left-hand leg of the U-shaped support 35 is provided with a laterally extending bracket 44 on which is mounted a guide member in the form of a rotatable sheave 45. The tractor includes force-exerting means here in the form of a power operated swingable arm 46, the end of which is connected to a flexible element in the form of a cable 47. This cable extends downwardly at the left-hand side of the tractor, is trained about the sheave 45 and passes to the right through a pair of alined openings 48 formed in the legs of the U-shaped support 35. The cable continues to the right and is connected to an arm 49 mounted on the inner end of the cutter-bar structure 32. Rocking of the power arm 46 will, through the cable 47, effect raising and lowering of the cutter-bar 22 with respect to the tractor about the longitudinal pivot provided in the casting 23a of the inner shoe or runner 23.

The power-lift means further includes a second arm 50 at the opposite side of the tractor. This arm may be connected by means of a flexible element in the form of a chain 51 to an ear 52 on an upper portion of the casting 23a. Rocking of the arm 50 will raise and lower the inner shoe 23 about the longitudinal pivot axis provided by the implement-carrying portion 31 of the frame member 30.

Operation and use

The preferred construction illustrated involves the use of the mower as an attachment to the tractor and as including the attachment frame 30; that is to say, the frame member 30 may be considered primarily a part of the mower. As will be seen, the attachment of the mower to the tractor involves only the connection of the frame 30 to the tractor body structure by means of the attaching element including the securing member 34 and bracket 19 and the attaching element including the U-shaped bracket 35 and capscrews 39. In addition, the cable 47 and chain 51 will require connection to the power arms 46 and 50. Detachment of the mower from the tractor may be just as easily and quickly accomplished.

The provision of the U-shaped support 35 and the association therewith of the cable 47 and sheave 45, as part of the lifting and lowering mechanism for the implement, is an important feature of the invention, inasmuch as the organization is relatively compact and does not include complicated linkages provided for the purpose of accommodating a complex frame structure.

The frame member 30 may be readily removed from the bearings 40 of the frame elements 24 of the mower for the purpose of using the frame member in connection with other implements if desired.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized here are not intended to exclude, but rather to suggest, such other adaptations and modifications of the invention as fall within the spirit and scope of the invention as defined in the appended claims.

What is claimed is:

1. An implement attachment frame for a tractor having a longitudinal body structure, comprising: an elongated tubular frame member adapted for disposition lengthwise of the tractor body structure and including a straight implement-carrying portion intermediate its ends and having its opposite ends provided as attaching elements attachable to the tractor body structure, one attaching element including an integral part of the frame member bent at an angle to the implement carrying portion and having an attachment member, and the other attaching element including a generally U-shaped support secured at the bight of the U to the frame member with the legs of the U extending generally normal to the frame member and adapted to engage the tractor body structure.

2. An implement attachment frame for a tractor having a longitudinal body structure, comprising: an elongated frame member adapted for disposition lengthwise of the tractor body structure and including an implement carrying portion, a pair of attaching elements attachable to the tractor body structure, one attaching element including a frame part offset with respect to the implement carrying portion and having an attachment member, and the other attaching element including a generally U-shaped support secured at the bight of the U to the frame member with the legs of the U extending upwardly from the frame member and adapted to engage the tractor body structure.

3. An implement attachment for a tractor of the type in which the tractor has a longitudinal body structure carried on front and rear wheels and the implement extends laterally at one side of the tractor between the front wheels comprising an attachment frame including a longitudinal frame member generally paralleling the tractor body structure; means for mounting the frame member on the tractor body structure including a support connected to the frame member; means providing an opening in the support; means connecting the implement to the frame member for raising and lowering movement of the implement with respect to the tractor; and raising and lowering actuating means on the tractor for raising and lowering the implement, including a guide member carried by the support adjacent the opening in the support, and a connecting element associated with the guide member and passing through said opening.

4. An implement attachment for a tractor of the type in which the tractor has a longitudinal body structure and the implement extends laterally at one side thereof comprising an attachment frame including a frame member disposed lengthwise as respects the tractor body structure; means for mounting the frame member on the tractor body structure including a support connected to the frame member; means providing an opening in the support; means connecting the implement to the frame member for raising and lowering movement of the implement with respect to the tractor; and raising and lowering actuating means on the tractor for raising and lowering the implement, including a guide member carried by the support adjacent the opening in the support, and a connecting element associated with the guide member and passing through said opening.

5. An implement attachment for a tractor having a longitudinal body structure comprising: an attachment frame, including a frame member disposed lengthwise beneath the tractor body structure; means for mounting the frame member on the tractor body structure including a U-shaped support connected to the frame member and having the legs of the U-shaped support extending upwardly toward and attached to the tractor body structure; means providing alined openings in the legs of the support; means connecting the implement to the frame member for raising and lowering movement of the implement with respect to the tractor; raising and lowering actuating means on the tractor for raising and lowering the implement, including a guide member carried by one leg of the support adjacent the opening in that leg, and a connecting element associated with the guide member and passing through said alined opening.

6. An implement attachment frame for a tractor having a longitudinal body structure and control means on the tractor for raising and lowering the implement comprising: an elongated tubular frame member adapted for disposition lengthwise of the tractor body structure and including a straight implement-carrying portion intermediate its ends and having its opposite ends provided as attaching elements attachable to the tractor body structure, one attaching element including an integral part of the frame-member bent at an angle to the implement carrying portion and having an attachment member, and the other attaching element including a generally U-shaped support secured at the bight of the U to the frame member with the legs of the U extending generally normal to the frame member and adapted to engage the tractor body structure; and guide support means carried by one leg of said U-shaped support for supporting and guiding the implement control means, said guide support means including a bracket supported by one leg of said U-shaped support and a guide member carried by said bracket.

7. The invention set forth in claim 6, in which: said implement control means including a flexible control element associated with said guide element and at least one of the legs of the U-shaped support is provided with an opening for receiving said flexible control element.

8. The invention set forth in claim 7, in which: both legs of the U-shaped support are provided with openings for receiving said flexible control element.

9. The invention set forth in claim 7, in which: said guide member is a sheave rotatably carried by said bracket.

SAMUEL E. HILBLOM.

REFERENCES CITED

The following references are of record in the file of this patent:

UNITED STATES PATENTS

| Number | Name | Date |
|---|---|---|
| 1,855,838 | Kranick | Apr. 26, 1932 |
| 2,311,117 | MacDonald et al. | Feb. 16, 1943 |
| 2,318,202 | Colvin et al. | May 4, 1943 |